(12) United States Patent
Suwabe

(10) Patent No.: US 10,261,734 B2
(45) Date of Patent: Apr. 16, 2019

(54) APPARATUS, METHOD AND STORAGE MEDIUM FOR CONTROLLING LOGOUT PROCESSING IN A JOB PROCESSING APPARATUS

(71) Applicant: CANON KABUSHIKI KAISHA, Tokyo (JP)

(72) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/158,187

(22) Filed: May 18, 2016

(65) Prior Publication Data
US 2016/0350042 A1 Dec. 1, 2016

(30) Foreign Application Priority Data

May 29, 2015 (JP) ................................ 2015-110207

(51) Int. Cl.
*G06F 3/12* (2006.01)
*H04N 1/00* (2006.01)

(52) U.S. Cl.
CPC .......... *G06F 3/1238* (2013.01); *G06F 3/1222* (2013.01); *H04N 1/00411* (2013.01); *H04N 2201/0094* (2013.01)

(58) Field of Classification Search
CPC . G06F 3/1238; G06F 3/1222; H04N 1/00411; H04N 2201/0094
See application file for complete search history.

(56) References Cited

U.S. PATENT DOCUMENTS

| 2007/0212027 | A1* | 9/2007 | Terao | H04N 1/4413 |
| | | | | 386/252 |
| 2008/0189716 | A1* | 8/2008 | Nakahara | G06F 21/608 |
| | | | | 718/105 |
| 2011/0020026 | A1* | 1/2011 | Yoshihara | G03G 15/50 |
| | | | | 399/80 |
| 2015/0242167 | A1* | 8/2015 | Yamaguchi | G06F 3/1222 |
| | | | | 358/1.14 |
| 2017/0102680 | A1* | 4/2017 | Marti | G05B 19/042 |

FOREIGN PATENT DOCUMENTS

| JP | 2008-193474 A | 8/2008 |
| JP | 2008-262338 A | 10/2008 |
| JP | 2015-055929 A | 3/2015 |

* cited by examiner

*Primary Examiner* — Iriana Cruz
(74) *Attorney, Agent, or Firm* — Canon USA Inc., IP Division

(57) ABSTRACT

A job processing apparatus receives from a user an instruction to log into the job processing apparatus. Further, when an auto logout time elapses, the job processing apparatus causes the user logged into the job processing apparatus to log out of the job processing apparatus. The job processing apparatus sets a logout time so that a time until the user whose login instruction is received in a state where another user is logged into the job processing apparatus is caused to log out of the job processing apparatus is shorter than a time until the user whose login instruction is received in a state where another user is not logged into the job processing apparatus is caused to log out of the job processing apparatus.

8 Claims, 15 Drawing Sheets

| AUTHENTICATION ID | USER NAME | PASSWORD |
|---|---|---|
| 00000001 | USER B | zzyyxx |
| 00000002 | USER X | xxxddd |
| .... | .... | .... |
| 00010001 | USER A | aabbcc |
| 00010002 | USER Y | eeeyyy |
| .... | .... | .... |
| 12345678 | USER Z | zzzfff |
| .... | .... | .... |

FIG.8A 810

DEVICE SETTINGS

<LOGOUT TRANSITION TIME>
SELECT TIME FOR AUTO LOGOUT.

| 10 SECONDS | 20 SECONDS | 50 SECONDS | 1 MINUTE |
| 2 MINUTES | 3 MINUTES | 4 MINUTES | 5 MINUTES |
| 6 MINUTES | 7 MINUTES | 8 MINUTES | 9 MINUTES |

CANCEL    OK

FIG.8B 820

DEVICE SETTINGS

<LOGOUT TRANSITION TIME>
SET TIME FOR AUTO LOGOUT.

PLEASE INPUT USING NUMERIC KEYPAD.

300    SECONDS

CANCEL    OK

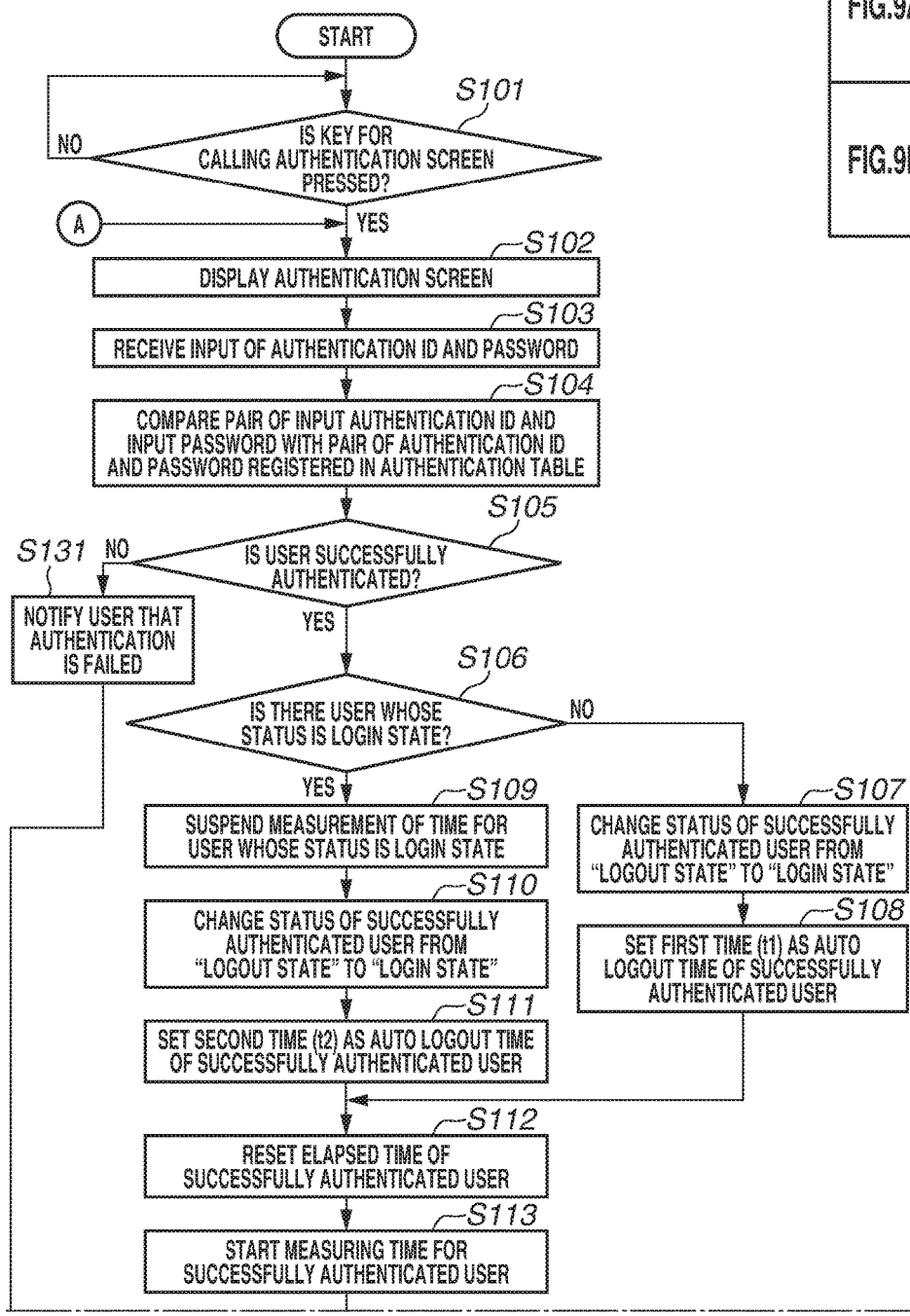
FIG.9A

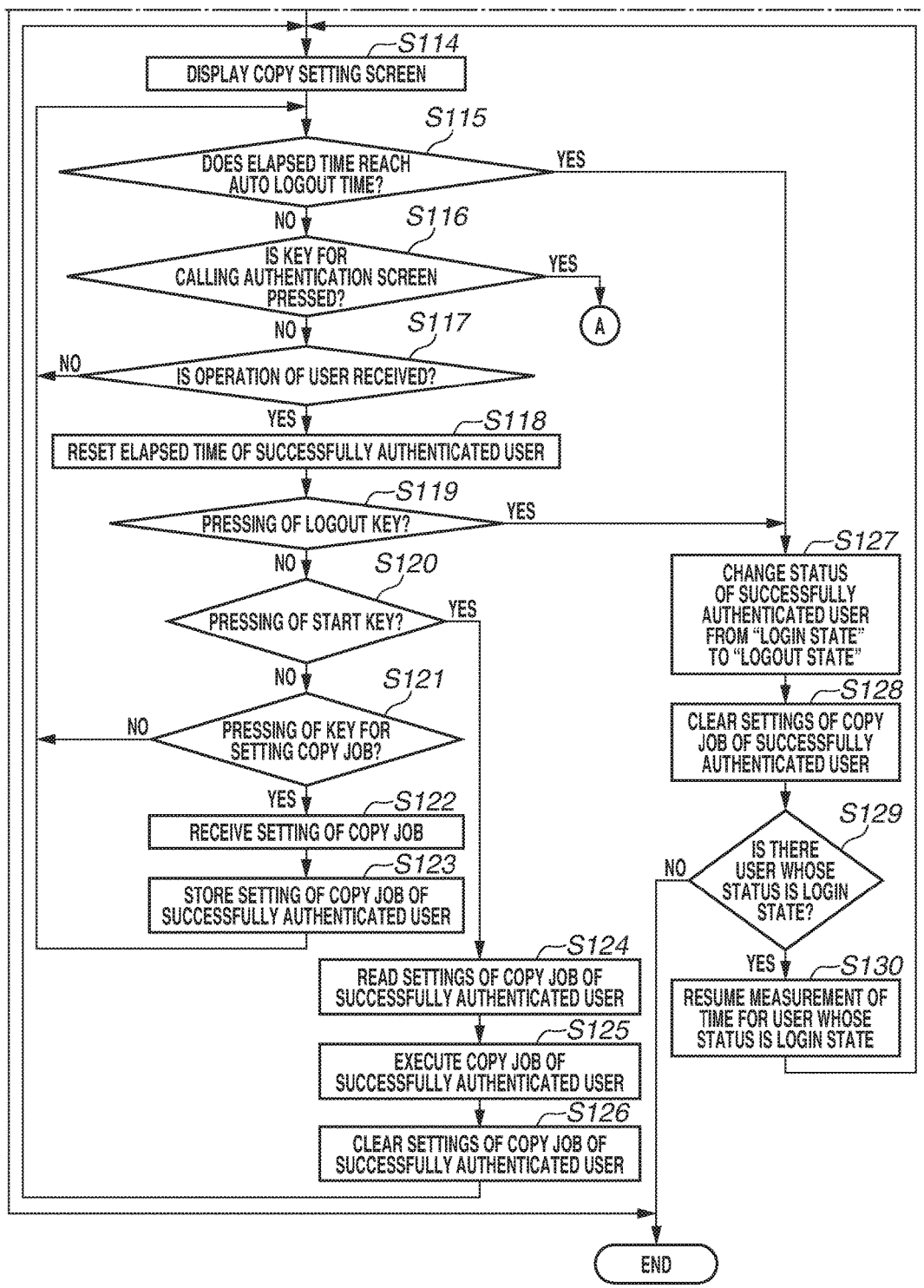

| AUTHENTICATION ID | STATUS | LAST LOGIN | AUTO LOGOUT TIME | ELAPSED TIME |
|---|---|---|---|---|
| 00000001 | LOGIN STATE | FALSE | 300 SECONDS | 200 SECONDS |
| 00000002 | LOGOUT STATE | FALSE | 300 SECONDS | — |
| .... | .... | FALSE | .... | .... |
| 00010001 | LOGIN STATE | TRUE | 20 SECONDS | 15 SECONDS |
| 00010002 | LOGOUT STATE | FALSE | 300 SECONDS | — |
| .... | .... | FALSE | .... | .... |
| 12345678 | LOGOUT STATE | FALSE | 300 SECONDS | — |
| .... | .... | FALSE | .... | .... |

FIG.11

| AUTHENTICATION ID | JOB SETTINGS |
|---|---|
| 00000001 | COPY, TWO-SIDED, 2 IN 1, TEXT/PHOTOGRAPH, ... |
| 00000002 | .... |
| .... | .... |
| 00010001 | SCAN TRANSMISSION, ADDRESS BOOK A, EMAIL, JPEG, ... |
| 00010002 | .... |
| .... | .... |
| 12345678 | .... |
| .... | .... |

APPARATUS, METHOD AND STORAGE MEDIUM FOR CONTROLLING LOGOUT PROCESSING IN A JOB PROCESSING APPARATUS

BACKGROUND

Field

Aspects of the present invention generally relate to a job processing apparatus, a method for controlling the job processing apparatus, and a storage medium.

Description of the Related Art

There is a technique for, when a user logs into the job processing apparatus after another user has been logged in a job processing apparatus, executing a print job of the user having logged in later by interrupting a print job of the other user having logged in earlier.

In a case of an image processing apparatus discussed in Japanese Patent Application Laid-Open No. 2008-193474, if a new user is successfully authenticated, and there is another user in the state of being logged in the image processing apparatus, the image processing apparatus stores, in a hard disk drive (HDD), information regarding print settings of the other user in the logged-in state. Then, the image processing apparatus receives, through an operation unit, print settings from the user having logged in later. Then, upon completion of a printing process of a print job of the user having logged in later, the image processing apparatus automatically cancels the login state of the user having logged in later. Next, when the login state of the user having logged in later is cancelled, the image processing apparatus reads from the HDD the information regarding the print settings of the other user in the logged-in state.

Even after the execution of a job of a user (referred to as a "user having logged in later") whose login instruction is received in the state where another user is logged in a job processing apparatus is completed, the user having logged in later may wish to further execute the job while remaining in the logged-in state. Meanwhile, if setting information about a job submitted by user having logged into a job processing apparatus earlier cannot be read unless a user having logged into the job processing apparatus later logs out of the job processing apparatus, there may be a need to cause the user having logged in later to log out of the job processing apparatus as soon as possible.

SUMMARY OF THE INVENTION

An aspect of the present invention is directed to an apparatus and a method capable of making a time period until a user, whose login instruction is received in a state where another user is logged in, is caused to automatically log out shorter than a time period until the user, whose login instruction is received in a state where another user is not logged in, is caused to log out.

According to an aspect of the present invention, a job processing apparatus includes a reception unit configured to receive from a user an instruction to log into the job processing apparatus, a logout processing unit configured to, based on elapse of an auto logout time, cause the user logged into the job processing apparatus to log out of the job processing apparatus, and a setting unit configured to set a second auto logout time so that the second auto logout time, until the user whose instruction is received by the reception unit in a state where another user is logged into the job processing apparatus is caused to log out of the job processing apparatus is shorter than a first auto logout time, until the user whose instruction is received by the reception unit in a state where another user is not logged into the job processing apparatuses caused to log out of the job processing apparatus.

Further features of aspects of the present invention will become apparent from the following description of exemplary embodiments with reference to the attached drawings.

BRIEF DESCRIPTION OF THE DRAWINGS

FIGS. 8A and 8B are diagrams each illustrating a configuration of a screen according to an exemplary embodiment.

FIG. 9 (consisting of FIGS. 9A and 9B) is a flowchart illustrating an example of control according to a first exemplary embodiment.

FIG. 11 is a schematic diagram illustrating a table according to the first exemplary embodiment.

DESCRIPTION OF THE EMBODIMENTS

Exemplary embodiments of the present invention will be described in detail below with reference to the accompanying drawings. The following exemplary embodiments do not limit the scope of the aspects of the present invention according to the appended claims, and not all the combinations of the features described in the exemplary embodiments are essential for a method for implementing aspects of the present invention.

In a first exemplary embodiment, a job processing apparatus receives from a user an instruction to log into the job processing apparatus. Further, when a logout time elapses since receipt of an operation of the user logged into the job processing apparatus, the job processing apparatus causes the user to log out of the job processing apparatus. The job processing apparatus sets a logout time so that a time period until the user, whose login instruction is received in a state where another user is logged in the job processing apparatus is caused to log out of the job processing apparatus is shorter than a time period until the user whose login instruction is received in a state where another user is not logged in the job processing apparatus is caused to log out of the job processing apparatus. The details are described below.

Figure 1:
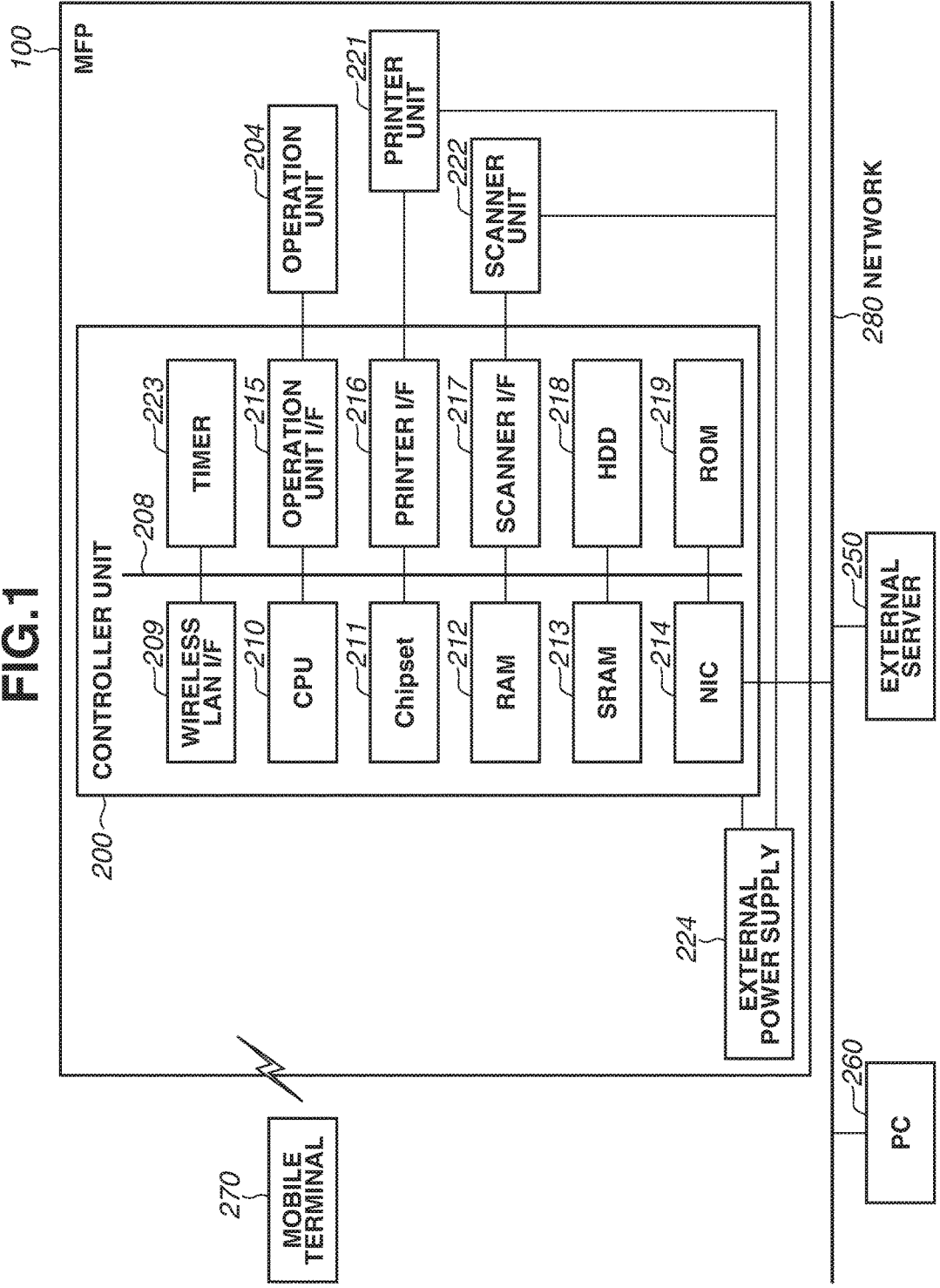
FIG. 1 is a block diagram illustrating a configuration of a multifunction peripheral (MFP) according to an exemplary embodiment.

With reference to a block diagram in FIG. 1, a description is given of the configuration of a multifunction peripheral (MFP) 100, which is an example of the job processing apparatus according to the first exemplary embodiment of the present invention.

The MFP 100 has an image reading function for reading a document to generate image data, and a print function (a copy function) for printing an image on a sheet based on the generated image data. The MFP 100 also has a print function (a PC print function) for receiving a print job from an external apparatus such as a personal computer (PC) 260 or an external server 250 and printing a text and an image on a sheet based on received data included in the print job. The printing performed by each print function may be color printing or monochrome printing.

The PC 260 generates image data using, for example, application software and transmits the generated image data to the MFP 100. Further, the PC 260 generates page description language (PDL) data using, for example, application software and a printer driver. Then, a controller unit 200 of the MFP 100 rasterizes the PDL data sent from the PC 260 via a network 280, to generate bitmap data.

The controller unit 200 is connected to an external apparatus such as the PC 260 or the external server 250 via the network 280 and performs the process of receiving a print job from the external apparatus. The network 280 may be a local area network (LAN) or a wide area network (WAN) such as the Internet.

FIG. 1 illustrates an example of the system configuration in which a single PC 260 is connected to the MFP 100 via the network 280. Aspects of the present invention, however, are not limited thereto. Alternatively, the configuration may be such that a plurality of PCs 260 is connected to the MFP 100 via the network 280. Further, FIG. 1 illustrates an example of the system configuration in which a single external server 250 is connected to the MFP 100 via the network 280. Aspects of the present invention, however, are not limited thereto. Alternatively, the configuration may be such that a plurality of external servers 250 is connected to the MFP 100 via the network 280.

The controller unit 200 of the MFP 100 is connected to a scanner unit 222, which is an image input device, and a printer unit 221, which is an image output device. The controller unit 200 controls the input and output of image information. Further, the controller unit 200, the scanner unit 222, and the printer unit 221 are connected to an external power supply 224.

The scanner unit 222 reads an image of a document using an optical sensor such as a charge-coupled device (CCD) sensor. Then, the scanner unit 222 acquires image data generated by reading the image of the document.

The printer unit 221 prints an image on a sheet based on image data input from the scanner unit 222, the PC 260, or the external server 250.

The external power supply 224 is a unit for supplying power to the controller unit 200, the scanner unit 222, and the printer unit 221.

Figure 2:
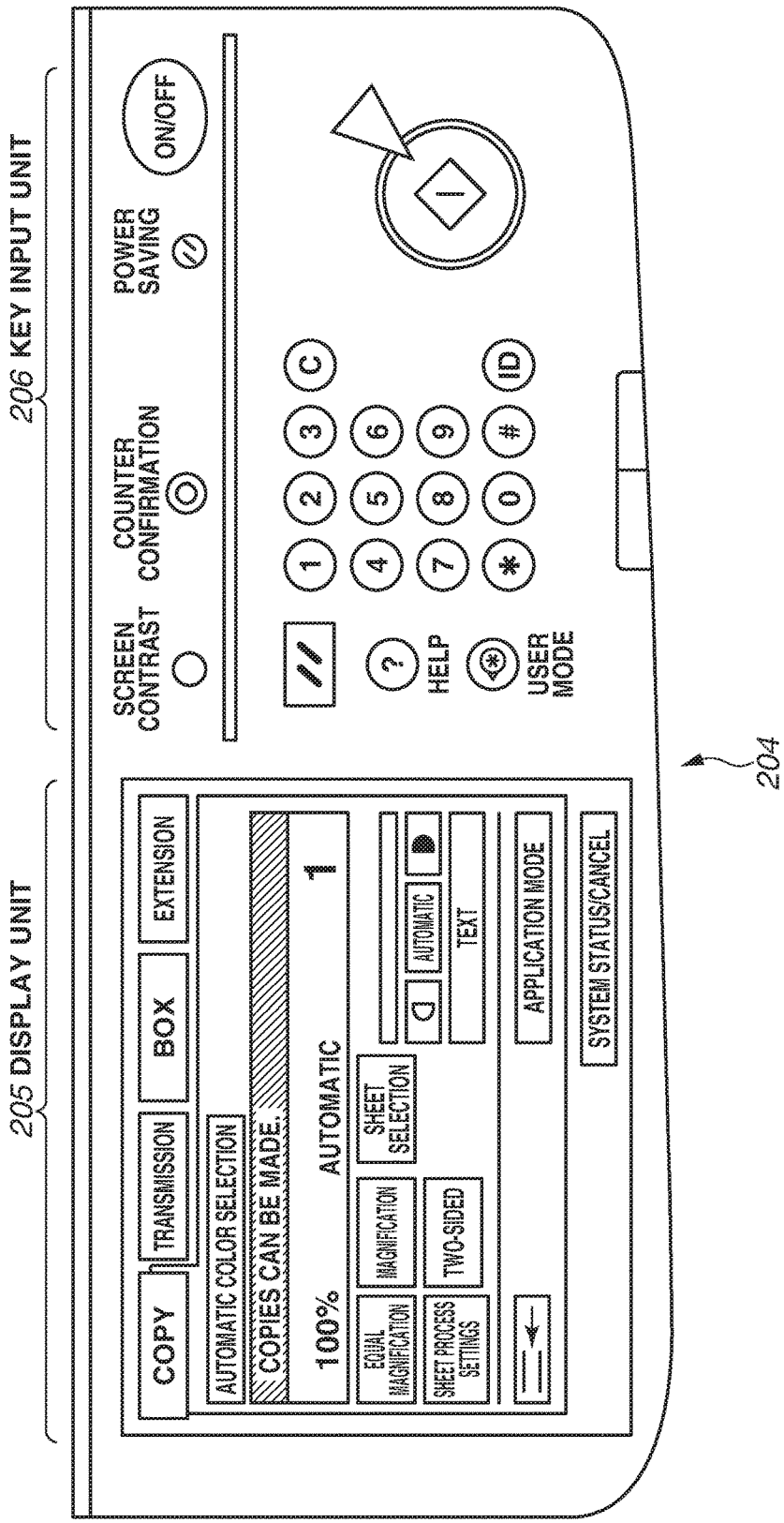
FIG. 2 is a diagram illustrating a configuration of an operation unit according to an exemplary embodiment.

The controller unit 200 is also connected to an operation unit 204, which corresponds to an example of a user interface unit. As illustrated in FIG. 2, the operation unit 204 includes a display unit 205 and a key input unit 206. The operation unit 204 has a function of providing information for a user through the display unit 205. The display unit 205 includes a liquid crystal display (LCD: a liquid crystal display unit) and a touch panel sheet having a transparent electrode attached to the LCD (or using a capacitance method). The operation unit 204 has a function of receiving various settings from the user through the touch panel sheet. On the LCD, an operation screen and the state of the MFP 100 are displayed. The key input unit 206 includes, for example, a start key, which is used to give an instruction to start the execution of scanning or copying, and a stop key, which is used to give an instruction to stop the operation of scanning or copying. The key input unit 206 also includes an authentication key, which is used to display on the display unit 205 an authentication screen (described later with reference to FIG. 3), and a numeric keypad, which is used to input a number.

The controller unit 200 includes a central processing unit (CPU) 210. The controller unit 200 further includes a chipset 211, a random-access memory (RAM) 212, a static random-access memory (SRAM) 213, a network interface card (NIC) 214, an operation unit interface (I/F) 215, a printer I/F 216, a scanner I/F 217, an HDD 218, a read-only memory (ROM) 219, a timer 223, and a wireless LAN I/F 209. These modules are connected to each other via a system bus 208.

The CPU 210 is a processor for controlling the entire MFP 100. Based on a control program stored in the ROM 219, the CPU 210 performs overall control of access to various devices connected to the MFP 100. The CPU 210 reads a control program stored in the ROM 219 and executes various types of control processing such as the control of reading by the scanner unit 222, the control of printing by the printer unit 221, and the control of the update of firmware.

The HDD 218 mainly stores information (system software) necessary to cause a computer to start and operate, and image data.

Further, the HDD 218 stores an authentication table, which will be described below with reference to FIG. 4, for managing an authentication identification (ID), a user name, and a password with respect to each user.

Further, the HDD 218 stores setting information about the device (e.g., the setting of the time period until the device is caused to transition to sleep mode, and the setting of the time period until a user logged in the MFP 100 is caused to automatically log out of the MFP 100).

Further, the HDD 218 stores a login management table (described below with reference to FIG. 10), for managing information regarding the logging into and the logging out of the MFP 100 with respect to each user.

Further, the HDD 218 stores a job setting table (described below with reference to FIG. 11), for managing job setting information (e.g., setting information about a copy job, or setting information about a scan transmission job) with respect to each user.

The chipset 211 includes a plurality of integrated circuits having a series of relations.

The RAM 212 is a readable and writable memory. The RAM 212 is also a system work memory for the operation of the CPU 210. Further, the RAM 212 is used as a temporary storage area for image data input from the scanner unit 222, the PC 260, or the external server 250. The RAM 212 is also used as a storage area for temporarily storing job setting information received from a user through the operation unit 204. Job setting information about a user stored in the RAM 212 is cleared from the RAM 212 when the user logs out of the MFP 100. Consequently, an occupied memory area in the RAM 212 is released, and therefore, the released memory area of the RAM 212 can be used for the execution of another process.

The SRAM 213 is a non-volatile memory. The SRAM 213 stores various programs and setting information such as an image adjustment value. Data stored in the SRAM 213 is not erased even if the MFP 100 is turned on again.

The ROM 219 is a read-only memory. The ROM 219 is also a boot ROM. The ROM 219 stores a boot program for the system in advance.

The ROM 219 or the HDD 218 stores various control programs to be executed by the CPU 210 and required to perform various types of processing of a flowchart described below with reference to FIG. 9. The ROM 219 or the HDD 218 also stores a program for executing rasterization. The ROM 219 or the HDD 218 also stores a display control program for displaying various user interface screens (hereinafter, "UI screens") on the display unit of the operation unit 204. The CPU 210 reads a program stored in the ROM 219 or the HDD 218 and loads the read program into the RAM 212, to perform various operations according to the present exemplary embodiment.

The timer 223 measures time (counts up or counts down) in real time while a user is logged into the MFP 100. When an operation is received from the user through the operation unit 204 while the user is logged in the MFP 100, the count value of the timer 223 is reset. For example, when the finger of the user touches a particular area of the display unit 205 while the user is logged in the MFP 100, the count value of the timer 223 is reset. Further, for example, when any key of the key input unit 206 is pressed while the user is logged in the MFP 100, the count value of the timer 223 is reset.

The printer I/F 216 is an interface for connecting the printer unit 221 and the controller unit 200. Image data to be printed by the printer unit 221 is transferred from the controller unit 200 to the printer unit 221 via the printer I/F 216.

The scanner I/F 217 is an interface for connecting the scanner unit 222 and the controller unit 200. Image data generated by the scanner unit 222 is output from the scanner unit 222 to the controller unit 200 via the scanner I/F 217.

The operation unit I/F 215 is an interface for connecting the operation unit 204 and the controller unit 200. The operation unit I/F 215 outputs, to the operation unit 204, image data to be displayed on the operation unit 204. Further, the operation unit I/F 215 transmits, to the CPU 210, information input by a user through the operation unit 204.

The wireless LAN I/F 209 wirelessly communicates with a mobile terminal 270. The mobile terminal 270 is an external mobile information terminal such as a personal digital assistant (PDA) or a smartphone. In the present exemplary embodiment, a description is given below of a case where a user is authenticated through an authentication screen (described below with reference to FIG. 3). Alternatively, a user may be authenticated via the mobile terminal 270.

The NIC 214 connects the controller unit 200 (the MFP 100) to the network 280. For example, the NIC 214 transmits image data and various pieces of information (e.g., job setting information received from a user through the operation unit 204) to the PC 260 or the external server 250. Further, for example, the NIC 214 receives update firmware and various pieces of information from the PC 260 or the external server 250.

Figure 3:
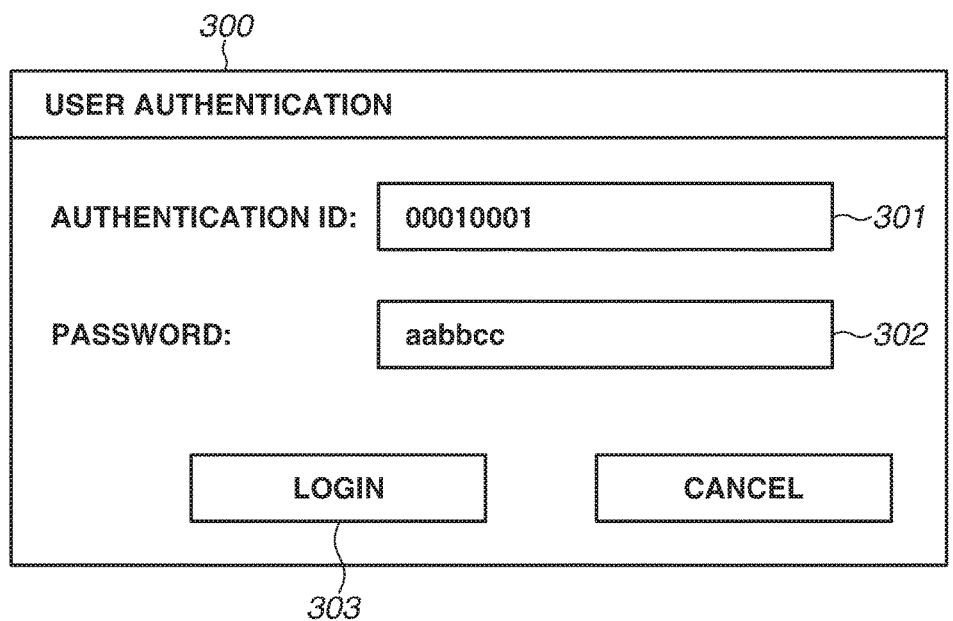
FIG. 3 is a diagram illustrating a configuration of a screen according to an exemplary embodiment.

Next, with reference to a configuration diagram in FIG. 3, a description is given of an example of an authentication screen 300, which is displayed on the display unit 205. For example, when a key for calling the authentication screen 300 (hereinafter referred to as an "authentication key") is pressed, the authentication screen 300 is displayed on the display unit 205. The authentication key may be included in the display unit 205 or the key input unit 206.

On the authentication screen 300, a form 301 for receiving an input of an authentication ID from a user, a form 302 for receiving an input of a password from the user, and a login button 303 are displayed.

Figure 4:
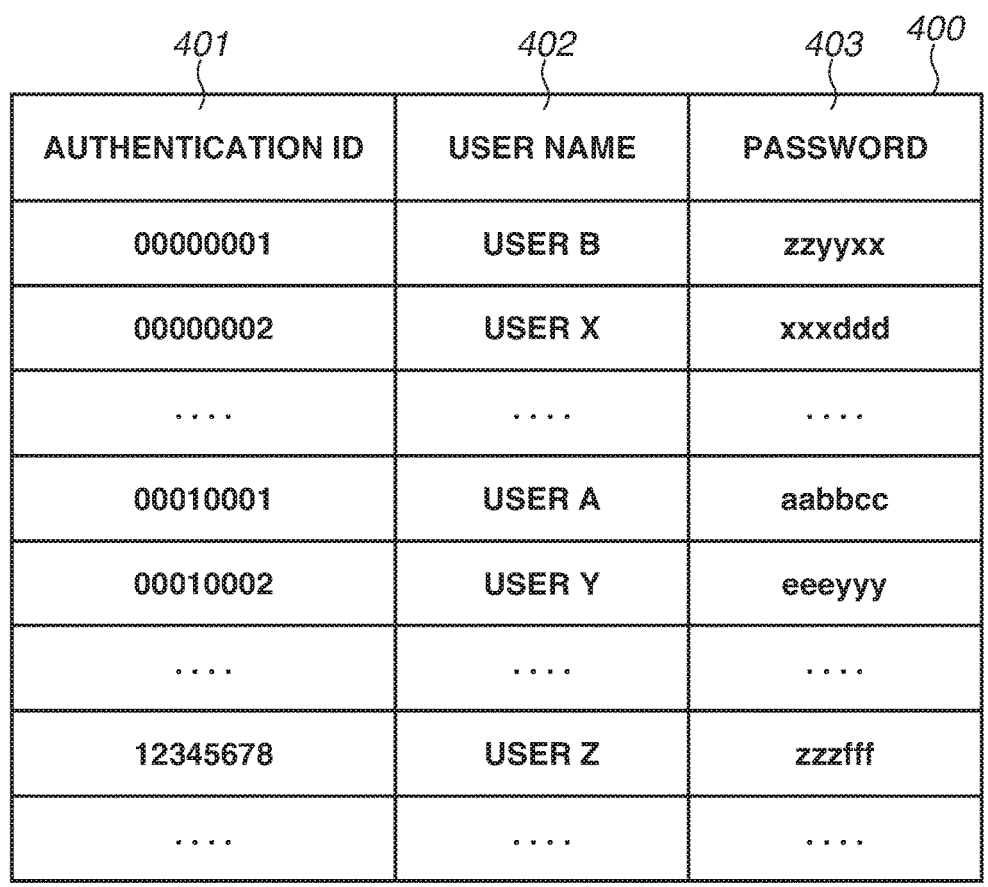
FIG. 4 is a schematic diagram illustrating a table according to an exemplary embodiment.

As illustrated in FIG. 4, the HDD 218 stores an authentication table 400, in which an authentication ID (401), a user name (402), and a password (403) are registered with respect to each user.

The user inputs an authentication ID to the form 301, inputs a password to the form 302, and then presses the login button 303. Then, the CPU 210 determines whether a pair of the authentication ID input to the form 301 and the password input to the form 302 matches a pair of an authentication ID (401) and a password (403) registered in the authentication table 400.

If the pair of the authentication ID input to the form 301 and the password input to the form 302 matches a pair of an authentication ID (401) and a password (403) registered in the authentication table 400, the user is successfully authenticated. If, on the other hand, the pair of the authentication ID input to the form 301 and the password input to the form 302 does not match a pair of an authentication ID (401) and a password (403) registered in the authentication table 400, the authentication of the user is failed.

Figure 5:
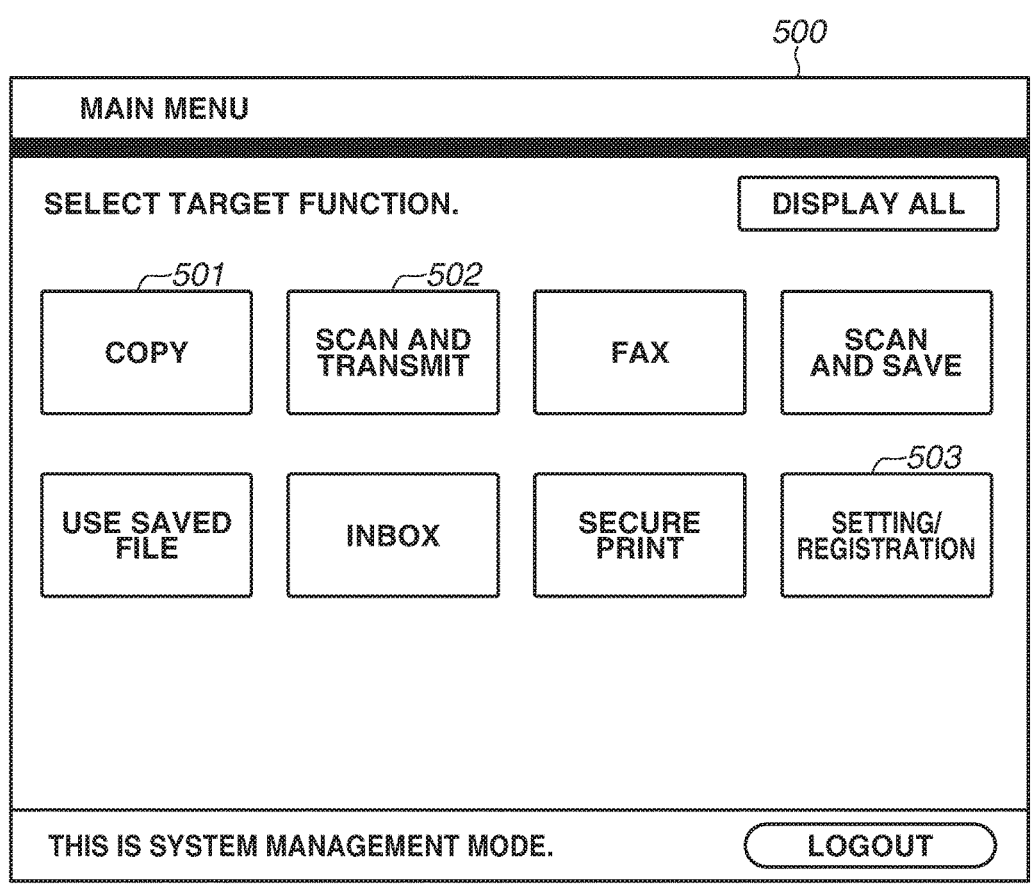
FIG. 5 is a diagram illustrating a configuration of a screen according to an exemplary embodiment.

Next, with reference to a configuration diagram in FIG. 5, a description is given of an example of a main screen 500, which is displayed on the display unit 205. For example, when the user is successfully authenticated, the main screen 500 is displayed on the display unit 205. Further, for example, when a key for returning to the main screen 500 is pressed in the state where the user is logged in the MFP 100, the main screen 500 is displayed on the display unit 205.

On the main screen 500, for example, buttons for calling various functions such as a copy function 501, a scan transmission function 502, and setting/registration 503 are displayed. By pressing a button on the main screen 500, the user selects one of the various functions such as the copy function 501, the scan transmission function 502, and the setting/registration 503. Then, as a result of the user selecting any one of the various functions, the main screen 500 transitions to a screen for using one of the various functions.

Figure 6:
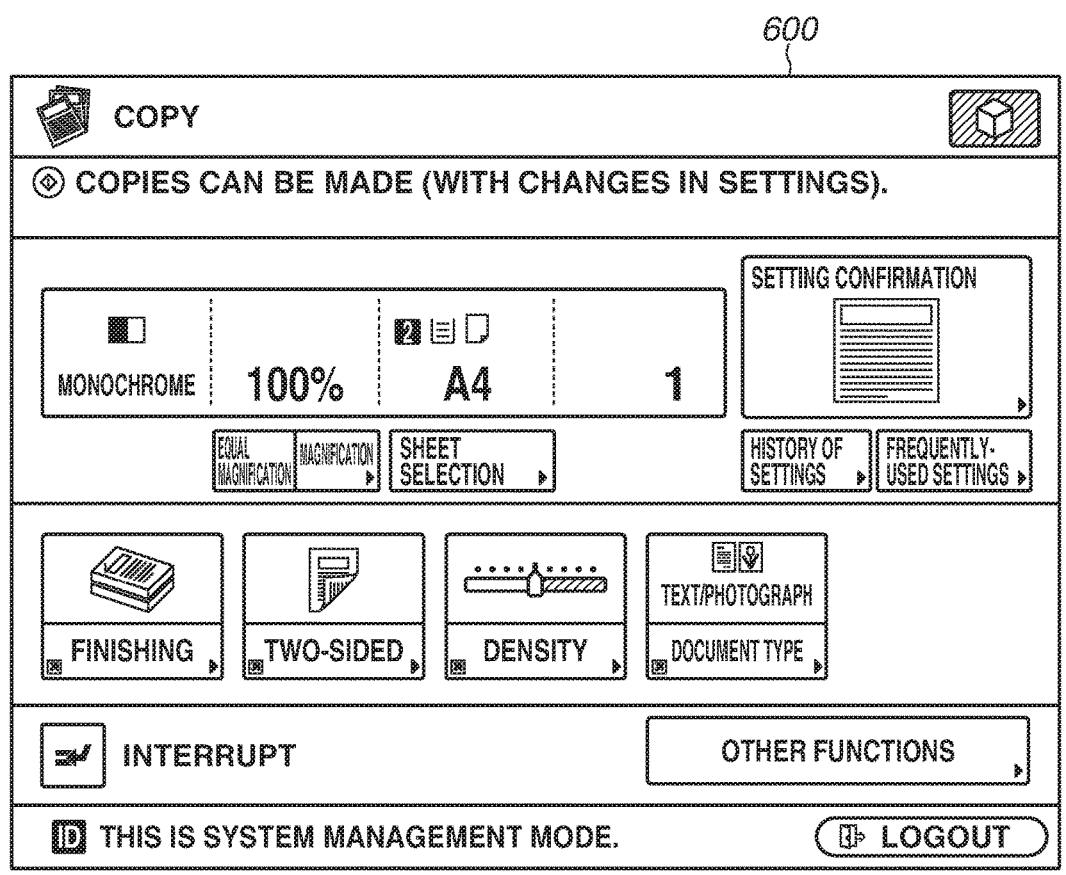
FIG. 6 is a diagram illustrating a configuration of a screen according to an exemplary embodiment.

For example, if the user selects the copy function 501, a setting screen 600 illustrated in FIG. 6 for using the copy function 501 is displayed on the display unit 205. The user makes settings of a copy job (e.g., magnification, sheet selection, finishing, and two-sided) through the setting screen 600. Then, the setting information about the copy job set by the user through the setting screen 600 is temporarily stored in the RAM 212. Alternatively, the setting information about the copy job set by the user through the setting screen 600 may be stored in the HDD 218.

Figure 7:
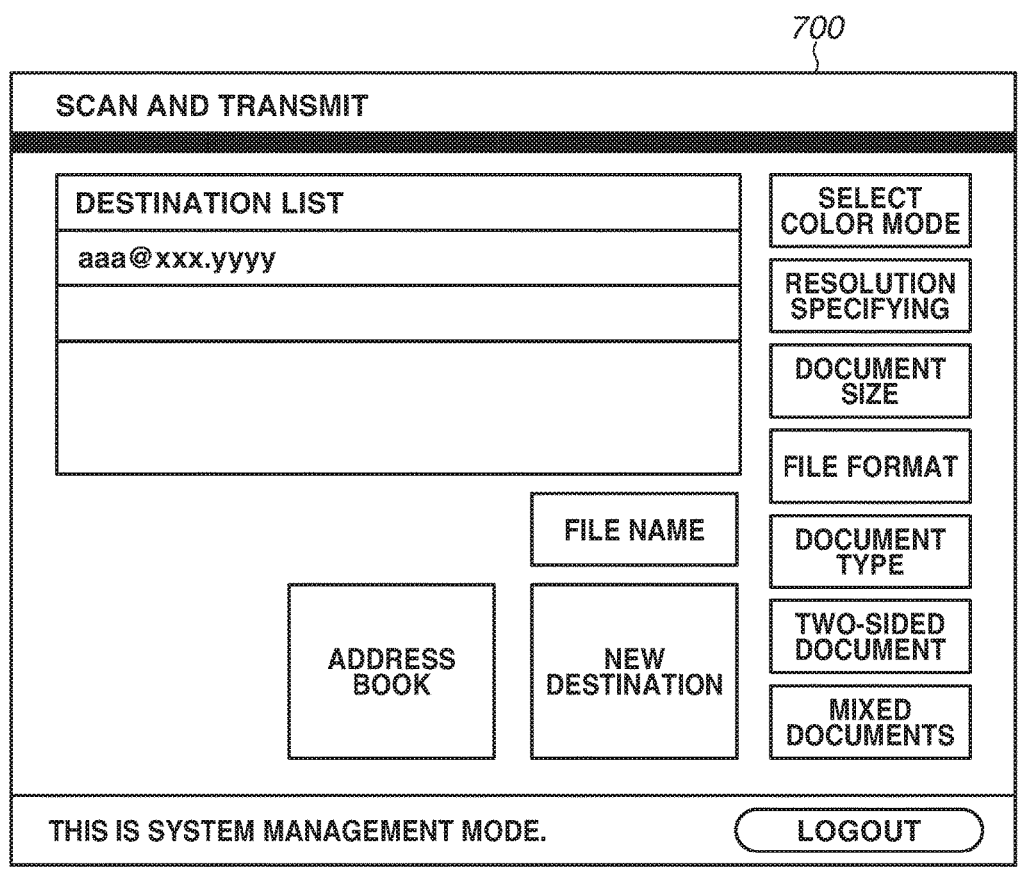
FIG. 7 is a diagram illustrating a configuration of a screen according to an exemplary embodiment.

Further, for example, if the user selects the scan transmission function 502, a setting screen 700 illustrated in FIG. 7 for transmitting image data generated by reading an image of a document to any destination is displayed on the display unit 205. The user makes settings of a scan transmission job (e.g., color mode selection, resolution specifying, document size, file format, and address book) through the setting screen 700. Then, the setting information about the scan transmission job set by the user through the setting screen 700 is temporarily stored in the RAM 212. Alternatively, the setting information about the scan transmission job set by the user through the setting screen 700 may be stored in the HDD 218.

Further, for example, if the user selects the setting/registration 503, a screen for making a setting regarding the device is displayed. For example, a setting screen 810 illustrated in FIG. 8A for setting the time period until a user logged in the MFP 100 is caused to automatically log out of the MFP 100 (hereinafter referred to as an "auto logout time") is displayed on the display unit 205.

Auto logout refers to a function of, if the count value of the timer 223 reaches a predetermined time in the state where a user is logged in the MFP 100, causing the user logged in the MFP 100 to automatically log out of the MFP 100. As described above, the timer 223 measures time (counts up or counts down) in real time while a user is logged in the MFP 100. Then, when an operation is received from the user through the operation unit 204 while the user is logged in the MFP 100, the count value of the timer 223 is reset.

The auto logout time can be optionally set by the user through the setting screen 810 in FIG. 8A. For example, the user can optionally select 10 seconds, 20 seconds, 50 seconds, . . . , 8 minutes, or 9 minutes as the auto logout time.

Alternatively, the auto logout time may be able to be optionally set by the user through a setting screen 820 illustrated in FIG. 8B. For example, the user sets the auto logout time to 300 seconds, using the numeric keypad of the key input unit 206.

A job processing apparatus receives from a user an instruction to log into the job processing apparatus. Further, when a logout time has elapsed since an operation of the user logged in the job processing apparatus was received, the job processing apparatus causes the user to log out of the job processing apparatus. The job processing apparatus sets a logout time so that a time period until the user whose login instruction is received in a state where another user is logged in the job processing apparatus, is caused to log out of the job processing apparatus is shorter than a time period until the user whose login instruction is received in a state where another user is not logged in the job processing apparatus, is caused to log out of the job processing apparatus.

The details are described below.

With reference to a flowchart illustrated in FIG. 9, a description is given of a series of processes in which, in the MFP 100 according to the first exemplary embodiment, a user logs into the MFP 100, and a job of the logged-in user is executed. This processing is performed by the CPU 210 executing a control program read from the ROM 219 or the HDD 218 and loaded into the RAM 212.

In step S101, the CPU 210 determines whether the key (the authentication key) for calling the authentication screen 300 in FIG. 3 is pressed. If it is determined that the authentication key is pressed (YES in step S101), then in step S102, the CPU 210 displays the authentication screen 300 on the display unit 205. If, on the other hand, it is determined that the authentication key is not pressed (NO in step S101), the process of step S101 is repeated until the authentication key is pressed.

Next, in step S103, the CPU 210 receives an input of an authentication ID and a password through the authentication screen 300.

Next, in step S104, the CPU 210 references the authentication table 400 stored in the HDD 218. Then, in step S104, the CPU 210 compares the pair of the input authentication ID and the input password with a pair of an authentication ID (401) and a password (402) registered in the authentication table 400.

Next, in step S105, based on the result of the comparison made in step S104, the CPU 210 determines whether a user is successfully authenticated. If the pair of the input authentication ID and the input password matches a pair of an authentication ID and a password registered in the authentication table 400, the CPU 210 determines that a user is successfully authenticated. If, on the other hand, the pair of the input authentication ID and the input password does not match a pair of an authentication ID and a password registered in the authentication table 400, the CPU 210 determines that a user is not successfully authenticated.

If it is determined that a user is not successfully authenticated (NO in step S105), then in step S131, the CPU 210 notifies the user that the authentication is failed. The notification that the authentication is failed may be given by displaying a message on the authentication screen 300. Alternatively, the notification that the authentication is failed may be given by sound or light. After the process of step S131 is executed, the series of processes regarding FIG. 9 ends.

If, on the other hand, it is determined that a user is successfully authenticated (YES in step S105), the processing proceeds to step S106.

Then, in step S106, the CPU 210 determines whether there is a user whose status is a login state (i.e., a user already logged in the MFP 100). The CPU 210 references a login management table 1000 illustrated in FIG. 10 and stored in the HDD 218. If there is a user whose status (1002) is a login state, the CPU 210 determines that a user is already logged in the MFP 100.

The details of the login management table 1000 are described.

In the login management table 1000, information about an authentication ID (1001), a status (1002), last login (1003), an auto logout time (1004), and an elapsed time (1005) is stored with respect to each user.

The authentication ID (1001) corresponds to the authentication ID (401) registered in the authentication table 400 in FIG. 4.

The status (1002) is information indicating whether the user is in the state of being logged in the MFP 100 or the state of being logged out of the MFP 100.

The last login (1003) is information indicating whether the user corresponds to the user having logged into the MFP 100 last among users currently logged in the MFP 100. If the user corresponds to the user having logged into the MFP 100 last among users currently logged in the MFP 100, the value of the flag of the last login (1003) is "true". If, on the other hand, the user does not correspond to the user having logged into the MFP 100 last among users currently logged in the MFP 100, the value of the flag of the last login (1003) is "false".

The auto logout time (1004) is information indicating the time for, if the count value of the timer 223 reaches a predetermined time in the state where the user is logged in the MFP 100, causing the user logged in the MFP 100 to automatically log out of the MFP 100.

The elapsed time (1005) is information indicating the count value of the timer 223.

Figure 10:
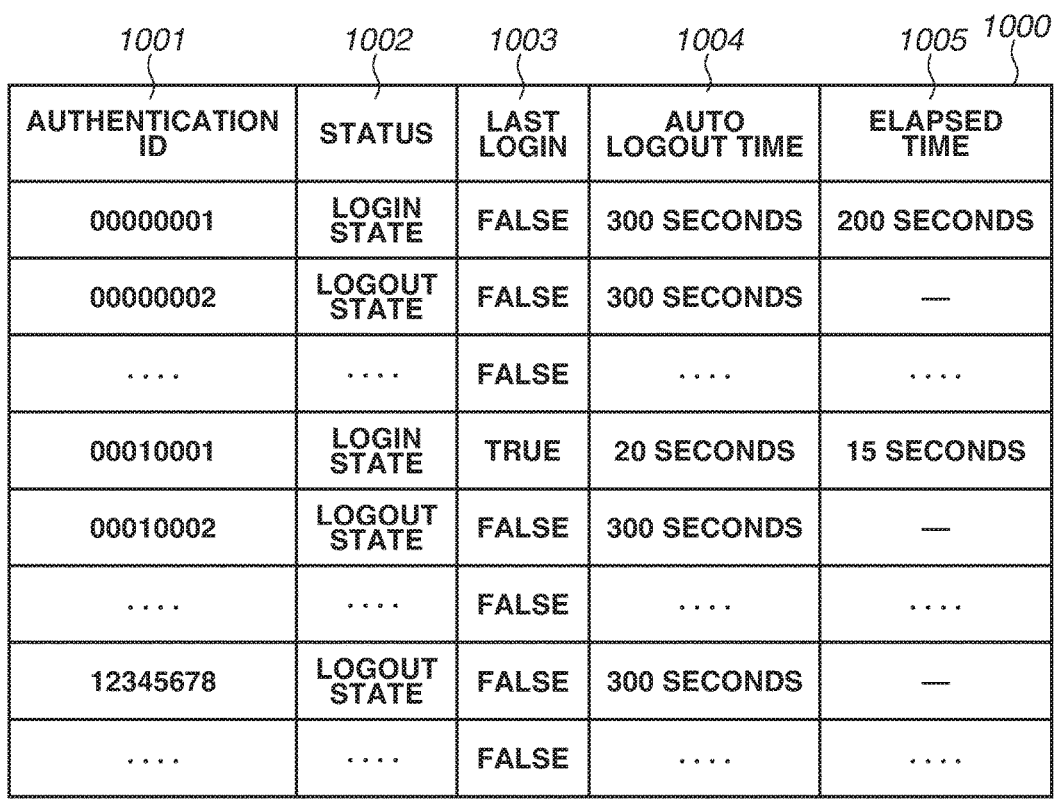
FIG. 10 is a schematic diagram illustrating a table according to the first exemplary embodiment.

For example, FIG. 10 illustrates the following states. In the case of a user whose authentication ID is "00000001", the user is in the state of being logged in the MFP 100 and is not the user having logged into the MFP 100 last, the auto logout time is 300 seconds, and the count value of the timer 223 is 200 seconds. The user whose authentication ID is "00000001" is a user B. For example, in the case of a user whose authentication ID (1001) is "00010001", the user is in the state of being logged in the MFP 100 and is the user having logged into the MFP 100 last, the auto logout time is 20 seconds, and the count value of the timer 223 is 15 seconds. The user whose authentication ID (1001) is "00010001" is a user A.

If it is determined that there is not a user whose status is a login state (i.e., a user already logged in the MFP 100) (NO in step S106), the processing proceeds to step S107. If, on the other hand, it is determined that there is a user whose status is a login state (i.e., a user already logged in the MFP 100) (YES in step S106), the processing proceeds to step S109.

First, the processes of steps S107 and S108 are described.

In step S107, the CPU 210 changes the status of the user successfully authenticated in step S105 from "logout state" to "login state". At this time, in the login management table 1000, the status (1002) of the user successfully authenticated in step S105 is updated from "logout state" to "login state" and then registered. Further, at this time, the value of the flag of the last login (1003) of the user successfully authenticated in step S105 is updated from "false" to "true" and then registered.

Next, in step S108, the CPU 210 sets a first time (t1) as the auto logout time (1004) of the user successfully authenticated in step S105.

The first time (t1) refers to the auto logout time set by the user through the setting screen 810 in FIG. 8A or the setting screen 820 in FIG. 8B.

For example, if the auto logout time set by the user through the setting screen 810 is "5 minutes", the first time (t1) is "300 seconds". That is, in the login management table 1000, the auto logout time (104) of the user successfully authenticated in step S105 is updated to "300 seconds" and then registered.

After the process of step S108 is executed, the processing proceeds to step S112.

Next, the processes of steps S109 to S111 are described.

In step S109, the CPU 210 suspends the measurement of time for the user whose status 1002 is a login state (i.e., the user already logged in the MFP 100). At this time, the counting up (or the counting down) of the timer 223 is suspended, but the count value of the timer 223 is not reset. The measurement of time for a user already logged in the MFP 100 is thus suspended, so that it is possible to prevent the timer of the user already logged in the MFP 100 from continuing to count up while a user having logged into the MFP 100 in an interrupting manner is operating the MFP 100.

Next, in step S110, the CPU 210 changes the status of the user successfully authenticated in step S105 from "logout state" to "login state". At this time, in the login management table 1000, the status (1002) of the user successfully authenticated in step S105 is updated from "logout state" to "login state" and then registered. Further, at this time, the value of the flag of the last login (1003) of the user successfully authenticated in step S105 is updated from "false" to "true" and then registered.

Next, in step S111, the CPU 210 sets a second time (t2) as the auto logout time of the user successfully authenticated in step S105.

The second time (t2) is a time shorter than the first time (t1) to be set in step S108. For example, if the first time (t1) is "300 seconds", the second time (t2) is a time (e.g., "20 seconds") shorter than 300 seconds. At this time, in the login management table 1000, the auto logout time (1004) of the user successfully authenticated in step S105 is updated from "300 seconds" to "20 seconds" and then registered.

The auto logout time (t2) of a user having logged into the MFP 100 (hereinafter referred to as an "interrupting user") in the state where there is a user already logged in the MFP 100 (hereinafter referred to as an "interrupted user") is thus made shorter than the auto logout time (t1) set for a normal state.

In this manner, the interrupting user is not caused to automatically log out of the MFP 100 shortly after the execution of a job is completed. Consequently, it is possible to give the interrupting user an extension of time for operating the MFP 100. In other words, if a second user logs into the job processing apparatus later in the state where a first user is logged in the job processing apparatus, the second user can further execute a job in the logged-in state even after the execution of a job of the second user having logged into the job processing apparatus later is completed.

Further, the interrupting user can be caused to automatically log out of the MFP 100 in the second time (t2), which is shorter than the first time (t1). This configuration enables the interrupted user to operate the MFP 100 as soon as possible. That is, it is possible to read as soon as possible, from the HDD 218, setting information about a job submitted by the user having logged into the job processing apparatus earlier.

After the process of step S111 is executed, the processing proceeds to step S112.

Next, the processes of step S112 and thereafter are described.

In step S112, the CPU 210 resets the elapsed time (1005) of the user successfully authenticated in step S105. The count value of the timer 223 of the user successfully authenticated in step S105 is reset, so that in the login management table 1000, the elapsed time (1005) of the user successfully authenticated in step S105 is reset. At this time, in the login management table 1000, the elapsed time (1005) of the user successfully authenticated in step S105 is updated to "0 seconds" and then registered.

Next, in step S113, the CPU 210 starts the measurement of time for the user successfully authenticated in step S105. At this time, the timer 223 for the user successfully authenticated in step S105 starts counting up (or counts down).

Next, in step S114, the CPU 210 displays on the display unit 205 the setting screen 600 in FIG. 6. A description is given below of an example where the copy function 501 is called through the main screen 500 in FIG. 5, and the setting screen 600 is displayed on the display unit 205. Aspects of the present invention, however, are not limited thereto. Aspects of the present invention can be also be similarly described using an example where the scan transmission function 502 is called through the main screen 500, and the setting screen 700 in FIG. 7 is displayed on the display unit 205.

In step S115, the CPU 210 determines whether the elapsed time (1005) of the user successfully authenticated in step S105 reaches the auto logout time (104) of the user successfully authenticated in step S105. The auto logout time (104) is the first time (t1) set in step S108 or the second time (t2) set in step S111.

If it is determined that the elapsed time (1005) of the user successfully authenticated in step S105 reaches the auto logout time (104) of the user successfully authenticated in step S105 (YES in step S115), the processing proceeds to time-period T127. If, on the other hand, it is determined that the elapsed time (1005) of the user successfully authenticated in step S105 does not reach the auto logout time (104) of the user successfully authenticated in step S105 (NO in step S115), the processing proceeds to step S116.

First, the processes of steps S116 to S123 are described.

In step S116, the CPU 210 determines whether the key (the authentication key) for calling the authentication screen 300 is pressed. If it is determined that the authentication key is pressed (YES in step S116), the processing returns to step S102. If, on the other hand, it is determined that the authentication key is not pressed (NO in step S116), the processing proceeds to step S117.

In step S117, the CPU 210 determines whether an operation of the user is received through the operation unit 204. If it is determined that an operation of the user is received (YES in step S117), the processing proceeds to step S118. If, on the other hand, it is determined that an operation of the user is not received (NO in step S117), the processing returns to step S115.

In step S118, the CPU 210 resets the elapsed time (1005) of the user successfully authenticated in step S105. The count value of the timer 223 of the user successfully authenticated in step S105 is reset, so that in the login management table 1000, the elapsed time (1005) of the user successfully authenticated in step S105 is reset. At this time, in the login management table 1000, the elapsed time (1005) of the user successfully authenticated in step S105 is updated to "0 seconds" and then registered.

Next, in step S119, the CPU 210 determines whether the operation, determined to be received, of the user in step S117 is the pressing of a key (a logout key) for causing a user to log out of the MFP 100. The logout key may be included in the display unit 205 or the key input unit 206. If it is determined that the operation of the user is the pressing of the logout key (YES in step S119), the processing proceeds to time-period T127. If, on the other hand, it is determined that the operation of the user is not the pressing of the logout key (NO in step S119), the processing proceeds to time-period T120.

In time-period T120, the CPU 210 determines whether the operation, determined to be received, of the user in step S117 is the pressing of a key (a start key) for starting the execution of a job. The start key may be included in the display unit 205 or the key input unit 206. If it is determined that the operation of the user is the pressing of the start key (YES in time-period T120), the processing proceeds to time-period T124. If, on the other hand, it is determined that the operation of the user is not the pressing of the start key (NO in time-period T120), the processing proceeds to time-period T121.

In time-period T121, the CPU 210 determines whether the operation, determined to be received, of the user in step S117 is the pressing of a key for setting a copy job. The key for setting a copy job is, for example, an equal magnification key, a magnification key, a sheet selection key, a finishing key, a two-sided key, a density key, or a document type key displayed on the setting screen 600. If it is determined that a key for setting a copy job is pressed (YES in time-period T121), then in time-period T122, the CPU 210 receives the setting of the copy job according to the pressed key. If, on the other hand, it is determined that a key for setting a copy job is not pressed (NO in time-period T121), the processing returns to step S115.

Next, in time-period T123, the CPU 210 temporarily stores the setting of the copy job received in time-period T122, in the RAM 212 as setting information about a job submitted by the user successfully authenticated in step S105. At this time, the CPU 210 may store the setting of the copy job received in time-period T122 in the HDD 218 as setting information about a job submitted by the user successfully authenticated in step S105. In this case, as in the job setting table 1100 illustrated in FIG. 11, the setting information about the copy job received in time-period T122 is registered in association with the authentication ID of the user successfully authenticated in step S105.

As illustrated in the job setting table 1100 in FIG. 11, for example, in the case of a user (i.e., the user B) whose authentication ID (1101) is "00000001", job setting information (1102) is "copy, two-sided, 2 in 1, text/photograph". Further, for example, in the case of a user (i.e., the user A) whose authentication ID (1101) is "00010001", job setting information (1102) is "scan transmission, address book, email, JPEG".

After the process of time-period T123 is executed, the processing returns to step S115.

Next, the processes of steps S124 to S126 are described.

In time-period 1124, the CPU 210 reads the setting information about the copy job temporarily stored in the RAM 212 (the setting information about a job submitted the user successfully authenticated in step S105). At this time, the CPU 210 may reference the job setting table 1100 and read the setting information about a copy job stored in the HDD 218 (the setting information about the job submitted by the user successfully authenticated in step S105).

Next, in time-period T125, the CPU 210 executes the copy job of the user successfully authenticated in step S105. For example, if the settings of the copy job of the user successfully authenticated in step S105 are "two-sided printing", "page layout: 2 in 1", and "document type: text/photograph", the copy job is executed based on these settings.

Next, in time-period T126, the CPU 210 clears the setting information about the copy job temporarily stored in the RAM 212 (the setting information about the job submitted by the user successfully authenticated in step S105). At this time, the CPU 210 may reference the job setting table 1100 and clear the setting information about the copy job stored in the HDD 218 (the setting information about a job submitted by the user successfully authenticated in step S105).

After the process of time-period T126 is executed, the processing returns to step S114.

Next, the processes of time-period T127 and thereafter are described.

In time-period T127, the CPU 210 changes the status of the user successfully authenticated in step S105 from "login state" to "logout state". At this time, in the login management table 1000, the status (1002) of the user successfully authenticated in step S105 is updated from "login state" to "logout state" and then registered. Further, at this time, the value of the flag of the last login (1003) of the user successfully authenticated in step S105 is updated from "true" to "false" and then registered.

Next, in time-period T128, the CPU 210 clears the setting information about the copy job temporarily stored in the RAM 212 (the setting information about the job submitted by the user successfully authenticated in step S105). At this time, the CPU 210 may reference the job setting table 1100 and clear the job setting information stored in the HDD 218 (the setting information about the job submitted by the user successfully authenticated in step S105).

Next, in time-period T129, the CPU 210 references the login management table 1000 and determines whether there is a user whose status 1002 is a login state.

If it is determined that there is a user whose status 1002 is a login state (YES in time-period T129), then in step S130, the CPU 210 resumes the measurement of time for the user whose status 1002 is a login state. This is because the measurement of time for the user whose status 1002 is a login state is suspended in step S109, so that it is necessary to resume the measurement of time for this user. After the process of step S130 is executed, the processing returns to step S114.

If, on the other hand, it is determined that there is not a user whose status 1002 is a login state (NO in time-period T129), the series of processes regarding FIG. 9 ends.

In step S130, the CPU 210 resumes the measurement of time for the user whose status 1002 is a login state. After the process of step S130, the processing returns to step S114.

The series of processes is described in the above description, in which in the MFP 100 according to the first exemplary embodiment, a user logs into the MFP 100, and a job of the logged-in user is executed.

Figure 12:
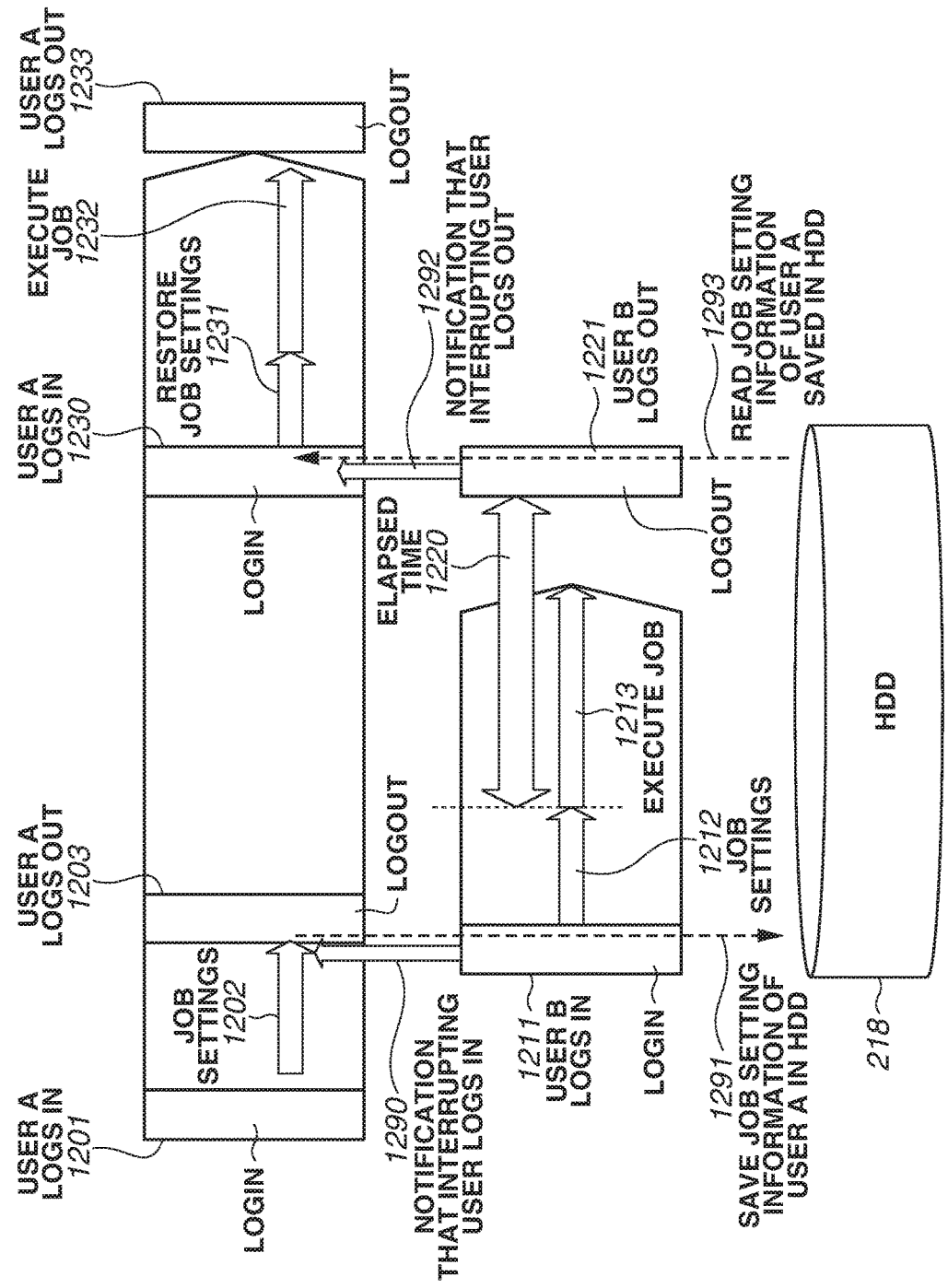
FIG. 12 is a schematic diagram illustrating an example of control according to the first exemplary embodiment.

Next, with reference to a schematic diagram (a time chart) in FIG. 12, a login system of the MFP 100 according to the first exemplary embodiment of the present invention is described.

Time 1201 represents that a first user (hereinafter referred to as a "user A") logs into the MFP 100.

During time 1202 indicated by a rightwards thick arrow, job setting information (setting information about a scan transmission job in this case) is received from the user A through the operation unit 204. The job setting information received from the user A in time 1202 is temporarily stored in the RAM 212.

Time 1211 represents that a second user (hereinafter referred to as a "user B") logs into the MFP 100.

Time 1290 represents that notification is given that an interrupting user (the user B in this case) logs into the MFP 100 in the state where the user A is logged in the MFP 100.

Time 1203 represents that in response to the interrupting user (the user B in this case) having logged into the MFP 100, an interrupted user (the user A in this case) is caused to log out of the MFP 100.

Time 1291 indicated by a downwards dashed arrow represents that the job setting information (the setting information about the scan transmission job in this case) received from the user A in time 1202 is stored in the HDD 218. If the user A is caused to log out, the setting information about the job submitted by the user A temporarily stored in the RAM 212 is cleared. For that reason, in time 1291, the setting information about the job submitted by the user A is saved in the HDD 218 at the timing when the user A logs out. In time 1291, a case has been described where the job setting information received from the user A is stored in the HDD 218. Aspects of the present invention, however, are not limited thereto. Alternatively, the job setting information received from the user A may be transferred to an external apparatus such as the PC 260 or the external server 250 via the network 280. In this case, the job setting information received from the user A is stored in a storage unit of the external apparatus such as the PC 260 or the external server 250.

In time 1212 indicated by a rightwards thick arrow, job setting information (setting information about a copy job in this case) is received from the user B through the operation unit 204. The job setting information received from the user B in time 1212 is temporarily stored in the RAM 212.

In time 1213 indicated by a rightwards thick arrow represents that based on the job setting information (the setting information about the copy job in this case) set in time 1212, the job (the copy job in this case) is executed.

Time 1220 indicated by left right double arrow represents the time has elapsed since an operation of the user B was received last through the operation unit 204.

Time 1221 represents that the interrupting user (the user B in this case) logs out of the MFP 100. When the user B presses a logout button, the user B may be caused to log out of the MFP 100. Alternatively, when in the login management table 1000, the elapsed time (1005) of the user B reaches the auto logout time (1004) of the user B, the user B may be caused to log out of the MFP 100.

Figure 13:
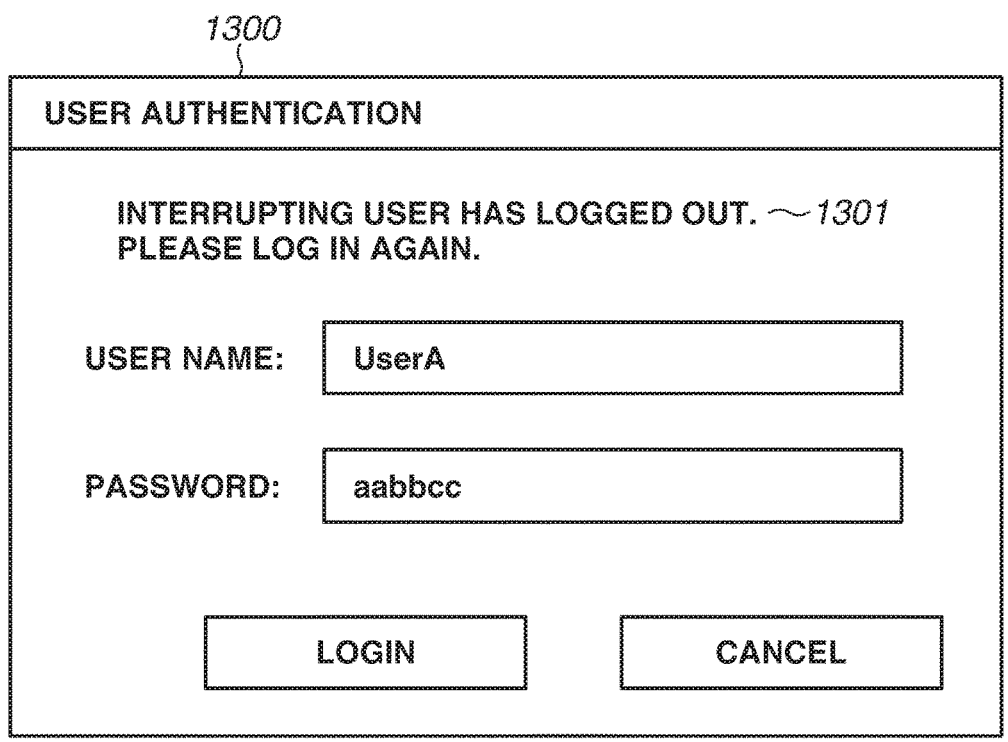
FIG. 13 is a diagram illustrating a configuration of a screen according to another exemplary embodiment.

Time 1292 represents that notification is given that the interrupting user (the user B in this case) logs out of the MFP 100. At this time, to prompt the user A to log into the MFP 100 again, the authentication screen 300 in FIG. 3 may be displayed on the display unit 205 in response to the notification that the interrupting user logs out. Alternatively, to emphatically prompt the user A to log into the MFP 100 again, an authentication screen 1300 illustrated in FIG. 13 may be displayed on the display unit 205. As illustrated in FIG. 13, the authentication screen 1300 is different from the authentication screen 300 in FIG. 3 in that a message 1301, "Interrupting user has logged out. Please log in again.", is displayed on the authentication screen 1300.

Time 1293 indicated by a upwards dashed arrow represents that when the user A logs into the MFP 100, the job setting information received from the user A (i.e., the job setting information stored in the HDD 218) is read from the HDD 218. At this time, based on the job setting table 1100 in FIG. 11 stored in the HDD 218, the job setting information (1102) corresponding to the authentication ID (1101) of the user A is read from the HDD 218.

Time 1231 indicated by a rightwards thick arrow represents that the job setting information (the setting information about the scan transmission job in this case) received from the user A is restored.

Time 1232 indicated by a rightwards thick arrow represents that based on the job setting information (the setting information about the scan transmission job in this case), the job (the scan transmission job in this case) is executed.

Time 1233 represents that the interrupted user (the user A in this case) logs out of the MFP 100. When the user A presses the logout button, the user A may be caused to log out of the MFP 100. Alternatively, when, in the login management table 1000, the elapsed time (1005) of the user A reaches the auto logout time (1004) of the user A, the user A may be caused to log out of the MFP 100.

As described above, in the first exemplary embodiment to which the present invention is applied, a job processing apparatus receives from a user an instruction to log into the job processing apparatus. Further, when a logout time elapses since receipt of an operation of the user logged into the job processing apparatus, the job processing apparatus causes the user to log out of the job processing apparatus. The job processing apparatus sets a logout time so that a time period until the user whose login instruction is received in a state where another user is logged in the job processing apparatus is caused to log out of the job processing apparatus is shorter than a time period until the user whose login instruction is received in a state where another user is not logged in the job processing apparatus is caused to log out of the job processing apparatus. Consequently, the interrupting user is not caused to automatically log out of the MFP 100 shortly after the execution of a job is completed. As a result, it is possible to give the interrupting user an extension of time for operating the MFP 100. In other words, even after the execution of a job of a user from which a login instruction is received (i.e., a user having logged into the job processing apparatus later) in the state where another user is logged in the job processing apparatus is completed, the user having logged into the job processing apparatus later can further execute the job while remaining in the logged-in state.

Further, the interrupting user can be caused to automatically log out of the MFP 100 in the second time (t2), which is shorter than the first time (t1), so that the interrupted user can operate the MFP 100 as soon as possible. In other words, it is possible to read as soon as possible, from the HDD 218, job setting information about the user having logged into the job processing apparatus earlier.

Other Exemplary Embodiments

Aspects of the present invention are not limited to the above exemplary embodiments. Various modifications (including the organic combinations of the exemplary embodiments) can be made based on the spirit of the aspects of the present invention, but are not excluded from the scope of the aspects of the present invention.

For example, in the present exemplary embodiment, a case has been described where the auto logout time (t1) set in step S108 in FIG. 9 is set by the user through the setting screen 810 in FIG. 8A or the setting screen 820 in FIG. 8B. Aspects of the present invention, however, are not limited thereto. Alternatively, the auto logout time (t1) and the auto logout time (t2) may be default values determined by the device. In this case, however, the auto logout time (t2) is shorter than the auto logout time (t1).

Figure 14:
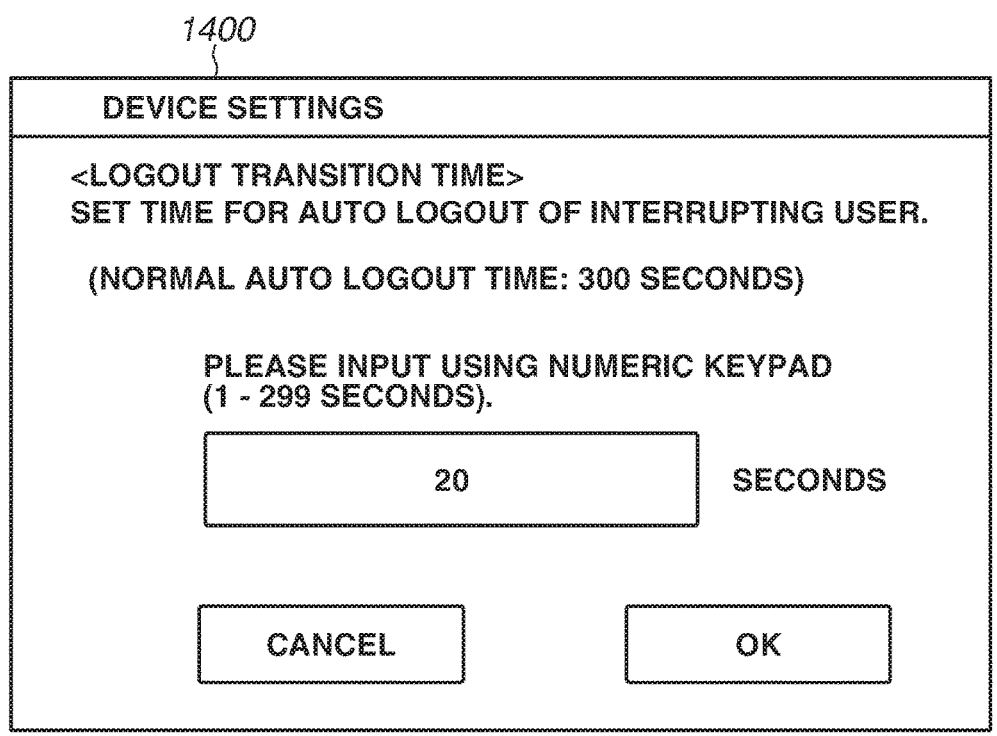
FIG. 14 is a diagram illustrating a configuration of a screen according to another exemplary embodiment.

Further, as a modified exemplary embodiment, the auto logout time (t2) set in step S111 in FIG. 9 may be able to be optionally set by the user through a setting screen 1400 illustrated in FIG. 14. In this case, the range of time that can be set by the user may be limited so that the auto logout time of an interrupting user (i.e., the auto logout time (t2)) is shorter than a normal auto logout time (i.e., the auto logout time (t1)). For example, if the auto logout time (t1) is 300 seconds, the range of time that can be set as the auto logout time (t2) is limited to 1 to 299 seconds.

Further, as another modified exemplary embodiment, the user may be able to optionally set how much shorter the auto logout time (t2) is than the auto logout time (t1). Further, as yet another modified exemplary embodiment, the user may be able to optionally set how much longer the auto logout time (t1) is than the auto logout time (t2).

Further, for example, in the present exemplary embodiment, a case has been described where in the login management table 1000 in FIG. 10, information regarding all the users capable of logging into the MFP 100 is stored. Aspects of the present invention, however, are not limited thereto. As a modified exemplary embodiment, in the login management table 1000, only information regarding users in the state of being logged in the MFP 100 (an interrupting user and an interrupted user) may be stored.

Further, for example, in the present exemplary embodiment, a case has been described where in the job setting table 1100 in FIG. 11, information regarding all the users capable of logging into the MFP 100 is stored. Aspects of the present invention, however, are not limited thereto. As a modified exemplary embodiment, in the job setting table 1100, only information regarding users in the state of being logged in the MFP 100 (an interrupting user and an interrupted user) may be stored.

Further, for example, in the present exemplary embodiment, a case has been described where if the user B logs into the MFP 100 in an interrupting manner in the state where the user A is logged in the MFP 100 earlier, the measurement of time for the user A is suspended. Aspects of the present invention, however, are not limited thereto. As a modified exemplary embodiment, if the user B logs into the MFP 100 in an interrupting manner in the state where the user A is logged in the MFP 100 earlier, the auto logout time of the user A may be lengthened by a predetermined time (e.g., 10 minutes) without suspending the measurement of time for the user A.

Further, for example, in the present exemplary embodiment, a case has been described where if the user B logs into the MFP 100 in an interrupting manner in the state where the user A is logged in the MFP 100 earlier, the authentication state of the user A automatically transitions from the login state to a logout state. Aspects of the present invention, however, are not limited thereto. For example, if the RAM 212 has ample memory capacity, the need to release a memory area of the RAM 212 is low. Consequently, it is not necessary to clear the job setting information about the user A stored in the RAM 212 to release a memory area of the RAM 212. Thus, as a modified exemplary embodiment, even if the user B logs into the MFP 100 in an interrupting manner in the state where the user A is logged in the MFP 100 earlier, the authentication state of the user A may not automatically transition from the login state to a logout state.

Further, for example, in the present exemplary embodiment, a description has been given using, as an example of the job processing apparatus, the MFP 100 having the image reading function and the print function (the copy function). Aspects of the present invention, however, are not limited thereto. Alternatively, the job processing apparatus may include either one of the image reading function and the printing function (the copy function) so long as the job processing apparatus can process a particular job. Yet alternatively, the job processing apparatus may include neither of the image reading function and the printing function (the copy function).

Further, for example, in the present exemplary embodiments, the CPU 210 of the controller unit 200 of the MFP 100 performs the above various types of control. Aspects of the present invention, however, are not limited thereto. Alternatively, a print control apparatus such as an external controller having a housing separate from the MFP 100 may be configured to perform some or all of the above various types of control.

Aspects of the present invention can also be achieved by the process of supplying a program for implementing one or more functions of the above exemplary embodiments to a system or an apparatus via a network or a storage medium, and causing one or more processors of a computer of the system or the apparatus to read and execute the program. Alternatively, aspects of the present invention can also be achieved by a circuit (e.g., an application-specific integrated circuit (ASIC)) for achieving one or more functions.

According to aspects of the present invention, it is possible to make a time period until a user whose login instruction is received in a state where another user is logged in a job processing apparatus is caused to log out of the job processing apparatus shorter than a time period until the user whose login instruction is received in a state where another user is not logged in the job processing apparatus is caused to log out of the job processing apparatus.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-110207, filed May 29, 2015, which is hereby incorporated by reference herein in its entirety.

What is claimed is:

1. A job processing apparatus comprising:
a memory device that stores a set of instructions; and
at least one processor that executes the instructions to:
receive an instruction to log into the job processing apparatus;
perform a log-out processing of a first user for the job processing apparatus, based on a predetermined first auto logout time elapsing, in a case where the instruction to log into the job processing apparatus is received from the first user in a state any other user other than the first user is not logged into the job processing apparatus, and the first user is logged into the job processing apparatus according to the received instruction; and
perform a log-out processing of the first user for the job processing apparatus, based on a second auto logout time elapsing, in a case where the instruction to log into the job processing apparatus is received from the first user in a state a second user is already logged into the job processing apparatus, and the first user is logged into the job processing apparatus according to the received instruction;
wherein each of measurement of the predetermined first auto logout time and measurement of the second auto logout time is reset in response to an operation of the job processing apparatus is received from the first user,
wherein each of the predetermined first auto logout time and the second auto logout time correspond to a time from an acceptance of a last operation by the first user to the logout processing of the first user, and
wherein the second auto logout time is shorter than the predetermined first auto logout time.

2. The job processing apparatus according to claim 1, wherein the at least one processor executes instructions in the memory device to:
receive a setting value about the predetermined first auto logout time; and
set the second auto logout time to be shorter than the first auto logout time corresponding to the received setting value.

3. The job processing apparatus according to claim 1, further comprising:
a timer that measures a time period having elapsed since receipt of an operation of the first user logged into the job processing apparatus.

4. The job processing apparatus according to claim 1, wherein the at least one processor executes instructions in the memory device to:
receive, from the first user, information for executing a job; and
store, in a storage, the received information from the first user whose instruction is received in a state where the second user is logged into the job processing apparatus.

5. The job processing apparatus according to claim 1, wherein the at least one processor executes instructions in the memory device to:
receive, from the first user, information for executing a job; and
transmit to an external apparatus the received information from the first user whose instruction is received in a state where the second user is logged into the job processing apparatus.

6. The job processing apparatus according to claim 1, wherein in a case where the instruction is received from the first user in a state where the second user is already logged into the job processing apparatus, the at least one processor performs a log-out processing of the second user from the job processing apparatus and the first user is logged into the job processing apparatus.

7. A method for controlling a job processing apparatus, the method comprising:
receiving an instruction to log into the job processing apparatus;
performing a log-out processing of a first user for the job processing apparatus, based on a predetermined first auto logout time elapsing, in a case where the instruction to log into the job processing apparatus is received from the first user in a state any other user other than the first user is not logged into the job processing apparatus, and the first user is logged into the job processing apparatus according to the received instruction; and
performing a log-out processing of the first user for the job processing apparatus, based on a second auto logout time elapsing, in a case where the instruction to log into the job processing apparatus is received from the first user in a state a second user is already logged into the job processing apparatus, and the first user is logged into the job processing apparatus according to the received instruction,
wherein each of measurement of the first auto logout time and measurement of the second auto logout time is reset in response to a user operation of the job processing apparatus is received,
wherein each of the predetermined first auto logout time and the second auto logout time correspond to a time from an acceptance of a last operation by the first user to the logout processing of the first user, and wherein the second auto logout time is shorter than the predetermined first auto logout time.

8. A non-transitory computer-readable storage medium storing computer executable instructions for causing a computer to execute a method for controlling a job processing apparatus, the method comprising:

receiving an instruction to log into the job processing apparatus;

performing a log-out processing of a first user for the job processing apparatus, based on a predetermined first auto logout time elapsing, in a case where the instruction to log into the job processing apparatus is received from the first user in a state any other user other than the first user is not logged into the job processing apparatus, and the first user is logged into the job processing apparatus according to the received instruction; and performing a log-out processing of the first user for the job processing apparatus, based on a second auto logout time elapsing, in a case where the instruction to log into the job processing apparatus is received from the first user in a state a second user is already logged into the job processing apparatus, and, the first user is logged into the job processing apparatus according to the received instruction, wherein each of measurement of the first auto logout time and measurement of the second auto logout time is reset in response to a user operation of the job processing apparatus is received, wherein each of the predetermined first auto logout time and the second auto logout time corresponds to a time from an acceptance of a last operation by the first user to the logout processing of the first user, and wherein the second auto logout time is shorter than the predetermined first auto logout time.

* * * * *